(12) United States Patent
Mikan et al.

(10) Patent No.: US 8,611,875 B2
(45) Date of Patent: Dec. 17, 2013

(54) CATEGORIZATION AND ROUTING OF CALLS BASED ON GENRE

(75) Inventors: Jeffrey Mikan, Atlanta, GA (US); John Lewis, Lawrenceville, GA (US); Justin McNamara, Atlanta, GA (US); Fulvio Arturo Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1021 days.

(21) Appl. No.: 12/355,481

(22) Filed: Jan. 16, 2009

(65) Prior Publication Data

US 2010/0183139 A1 Jul. 22, 2010

(51) Int. Cl.
*H04M 3/42* (2006.01)
*H04L 12/58* (2006.01)
*H04M 1/64* (2006.01)
*H04M 11/00* (2006.01)

(52) U.S. Cl.
USPC ............. 455/415; 455/412.1; 379/88.19; 379/88.21; 379/88.22; 379/88.23; 379/93.23; 379/210.02; 379/210.03

(58) Field of Classification Search
USPC ........................................... 455/415
See application file for complete search history.

(56) References Cited

U.S. PATENT DOCUMENTS

| 6,226,512 B1 * | 5/2001 | Macaulay et al. ......... 455/414.1 |
| 2002/0012426 A1 * | 1/2002 | Gupton .................... 379/210.02 |
| 2002/0085700 A1 * | 7/2002 | Metcalf .................... 379/210.01 |

\* cited by examiner

*Primary Examiner* — Huy C Ho
(74) *Attorney, Agent, or Firm* — Woodcock Washburn LLP

(57) ABSTRACT

A network component in communication with a call message system is disclosed. The network component includes a configurable communications portion and a configurable processor portion. The communications portion is configured to detect a call indicative of a call to a mobile device. The processor portion is configured to determine an originator of the call. The processor portion is also configured to determine a genre of the call. The determination of the genre of the call is based at least in part on the originator of the call. The genre of the call is compared to a predetermined genre. The processor portion is configured to terminate the call or to provide the call to the call message system based on the comparison of the genre of the call to the predetermined genre.

26 Claims, 10 Drawing Sheets

CATEGORIZATION AND ROUTING OF CALLS BASED ON GENRE

BACKGROUND OF THE INVENTION

Wireless communication devices such as cellular telephones (cell phone), other mobile communication devices that are combined with cellular telephones, cellular telephones that are combined with other electronic devices, such as digital cameras, and the like have become prevalent in society. Due to the small form factors of these mobile devices, subscribers and other users may often have the mobile device with them at all times of the day and night. For example, a user may have a cell phone clipped to a belt, in a brief case, purse or a computer bag, for example. Also, it is typical for the cell phone owner to use the cell phone for most of the owner's telephonic communications.

Due to this ready availability of cell phones, it is not uncommon for a user to receive calls from certain persons or organizations, or certain types of persons or organizations with whom the cell phone owner does not wish to communicate. The types of persons or organizations with which a user may not wish to communicate with could be described according to one or more genres. By way of example and not limitation, telemarketing solicitations could be classified under a commercial genre; charitable solicitations could be classified under a charitable genre; and political messages or solicitations could be classified under a political genre. Such genres may be identified by the user as undesirable or unwanted.

When a cell phone user receives a call from certain types of persons or organizations with whom the user does not wish to communicate, the user may face a frustrating situation. For example, in one instance, the cell phone user may either be on an existing call or in a location that prohibits taking a new call, such as a business meeting or the like, when the new call is received. If the call is one of an undesirable or unwanted genre, the user may wish to have the new call blocked or to be automatically directed to a call message system, such as a voicemail system or the like. In another example, the user may simply never wish to be disturbed by calls from certain types of unwanted or undesirable genres. Thus, the user may wish calls of certain previously identified unwanted or undesirable genres to be blocked (or terminated) or to be automatically directed to a call message system at all times.

Thus, mobile device users may benefit from systems and methods that enable calls to be classified by more or more genres and, according to the user's predetermined preference for certain call genres, having calls of unwanted or undesirable genres blocked or automatically directed to a call message system.

SUMMARY OF THE INVENTION

A network component may be in communication with a call message system. The network component may comprise a communications portion. The communications portion may be configured to detect a call indicative of a call to a mobile device. The network component may also comprise a processor portion. The processor portion may be configured to determine an originator of the call and to determine a genre of the call based at least in part on the originator of the call. The processor portion may also be configured to compare the genre of the call to a predetermined genre and provide the call to the call message system based on the comparison of the genre of the call to the predetermined genre.

A network component may be in communication with a call message system. The call message system may be configured to record header information for a call. The header information may include an attribute corresponding to a genre of the call. The network component may comprise a communications portion. The communications portion may be configured to detect a call indicative of a call to a mobile device. The network component may also comprise a processor portion. The processor portion may be configured to determine an originator of the call. The processor portion may also be configured to determine the genre of the call based at least in part on the originator of the call and to provide the call to the call message system upon a determination that a mobile device user does not receive the call within a predetermined period of time. The processor portion may also be configured to write the genre of the call into the attribute upon the call being provided to the call message system.

A method of configuring a network component may comprise configuring a communications portion of the network component to detect a call indicative of a call to a mobile device. The method may also comprise configuring a processor portion of the network component to determine an originator of the call. The method may also comprise configuring the processor portion to determine a genre of a call based at least in part on the originator of the call and to compare the genre of the call to a predetermined genre. The processor portion may also be configured to provide the call to a call message system based on the comparison of the genre of the call to the predetermined genre.

A network component may comprise a communications portion. The communications portion may be configured to detect a call indicative of a call to a mobile device. The network component may also comprise a processor portion. The processor portion may be configured to determine an originator of the call and to determine a genre of the call based at least in part on the originator of the call. The processor portion may also be configured to compare the genre of the call to a predetermined genre. The processor portion may also be configured to terminate the call or store the call, the terminating or storing based on the comparison of the genre of the call to the predetermined genre. Thus, the embodiment contemplates that the call will be terminated or stored based on the comparison of the genre of the call to the predetermined genre.

A network component may comprise a communications portion. The communications may be configured to detect a call indicative of a call to a mobile device. The network component may also comprise a processor portion. The processor portion may be configured to determine an originator of the call and to determine a genre of the call based at least in part on the originator of the call. The processor portion may also be configured to compare the genre of the call to a predetermined genre and to terminate the call based on the comparison of the genre of the call to the predetermined genre.

DETAILED DESCRIPTION OF ILLUSTRATIVE EMBODIMENTS

Figure 1:
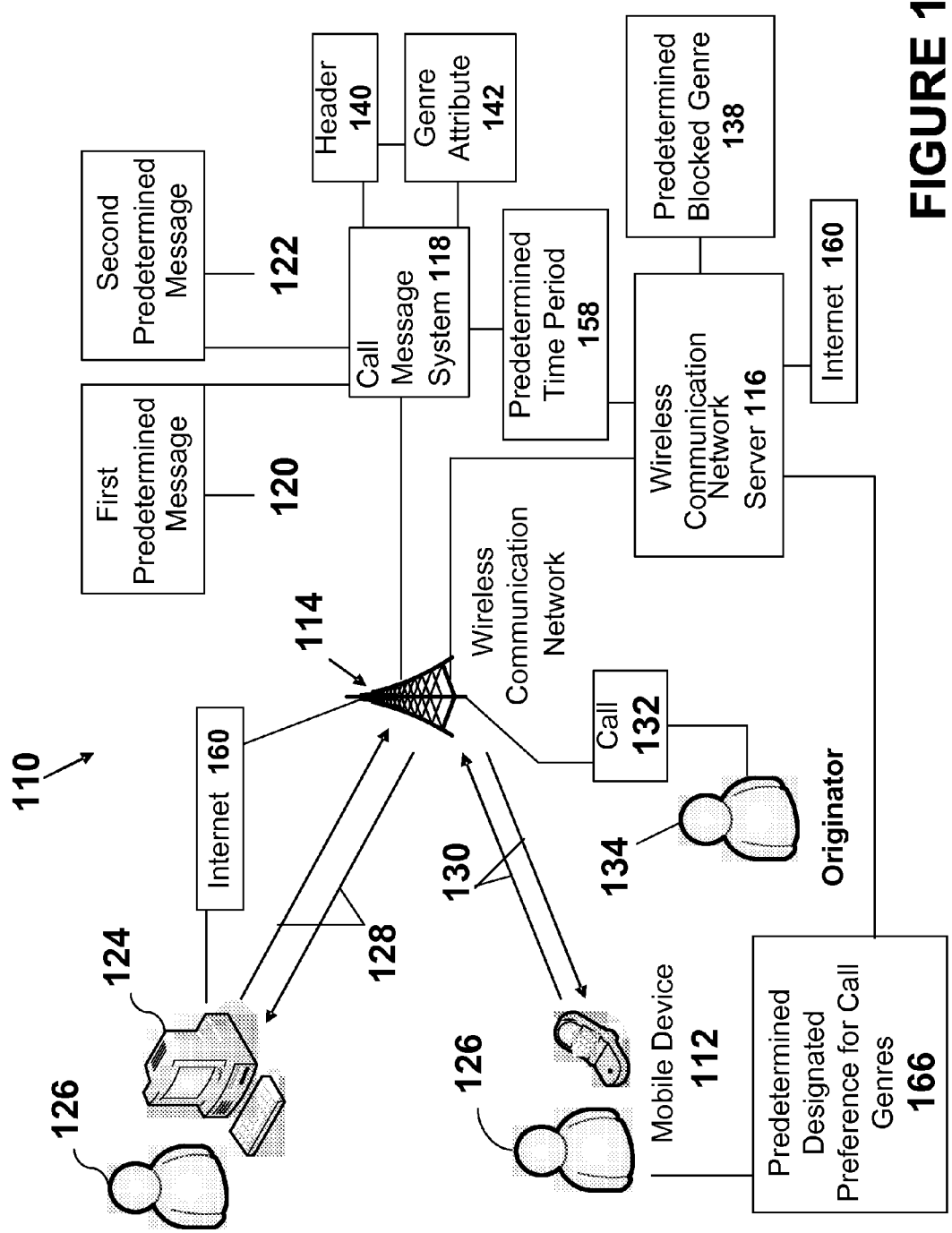
FIG. 1 depicts an overview of an architecture of a wireless communication system in which aspects of an embodiment may be implemented.

FIG. 1 depicts an overview of a wireless communication system 110 in which embodiments may be implemented. The wireless communication system (WCS) 110 may include but is not limited to a mobile device 112, a wireless communication network (WCN) 114, a wireless communication network server (WCNS) 116, a call message system (CMS) 118, a first predetermined message (FPM) 120 and a second predetermined message (SPM) 122. A mobile device user 126, who might also be referred to as a WCS 110 or WCN 114 subscriber or more simply as a user, may interface with the WCN 114 through the mobile device 112 which is in communication with the WCN 114 through wireless communication channel 130. The user 126 may also interface with the WCN 114 via a personal computer 124 that is in communication with the WCN 114 through communication channel 128. Communication channel 128 may include, but is not limited to an Internet 160 based connection, a wireless connection such as radio frequency for example, a telephone based dial-up connection and the like.

An originator 134, or caller, may initiate communication with the user 126 by placing a call 132 to the user 126. The originator 134 may, by way of example and not limitation, initiate such a call from another wireless device, a traditional wired telephone, a telephone switchboard, or a computing device in communication with the WCN 114. The WCNS 116 may be in communication with the Internet 160, and accordingly, the user 126 may in communication with the Internet 160 via mobile device 112, the WCN 114, and the WCNS 116, for example.

The CMS 118 may be implemented as any system that is in communication with the WCN 114 and the WCNS 116. The CMS 118 may include any hardware and/or software necessary for operating and/or controlling the CMS 118. For example, the CMS 118 may include a processing portion that may be individual digital logic components, a processor, a microprocessor, and application-specific integrated circuit (ASIC), and the like. The processing portion may include a memory such as random access memory, register memory, cache memory and the like. Memory may include computer executable attractions by which the processing portion may operate. For example, computer executable structures may include computer executable code that, when executed, operate the relevant actions associated with the processing portion.

The CMS 118 is capable of recording, digitally or otherwise, a message left by a caller after the call is put in communication with the CMS 118. The CMS 118 may receive a call from the WCN 114 or the WCNS 116 after a predetermined time period 158 expires indicating that a call to the mobile device 112 may not be answered, or received, by the user 126. Alternatively, the CMS 118 may also receive a call from the WCN 114 or the WCNS 116 upon a predetermined condition, or the like, being met that requires a transfer of the call to the CMS 118.

Figure 5:
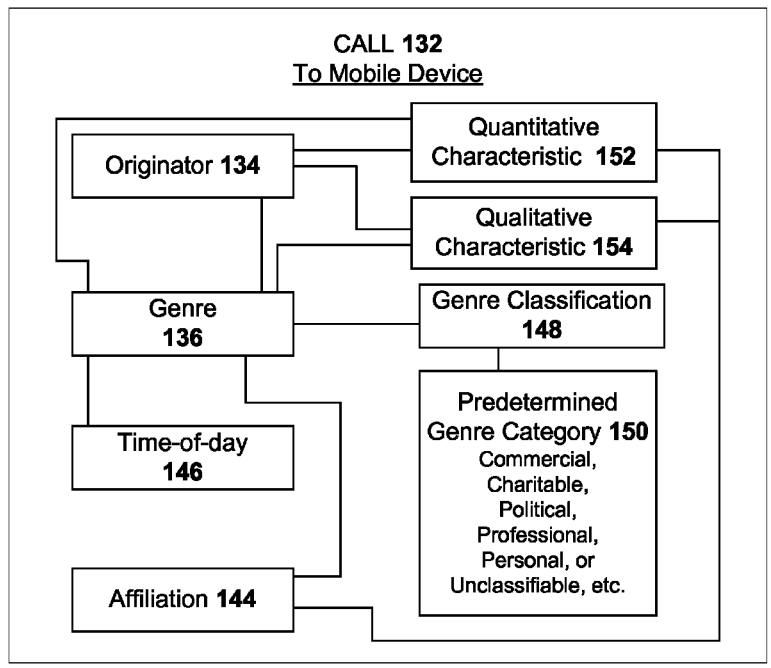
FIG. 5 depicts a block diagram of a classification of the genre of a call to a mobile device with which aspects of an embodiment may be implemented.
Figure 5:
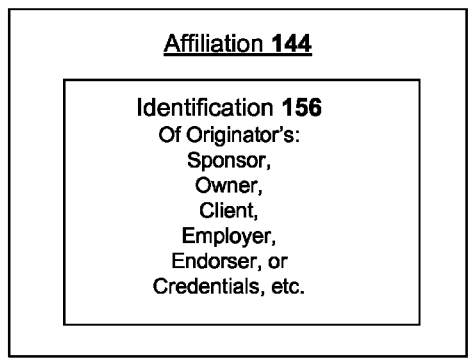

The CMS 118 may be further capable of recording other data regarding the call in a header information section 140, for example. As seen in FIGS. 1 and 5, information recorded in the header 140 may include but not be limited to a call identification, the identity of the originator 134, the time of day 146 that the call was received and the time of the duration of the call (or message). The header 140 may store this information either collectively or as individually as attributes, for example.

The mobile device 112 may be one of but not limited to a cellular telephone, a cellular telephone in combination with another electronic device and a cellular telephone in combination with another wireless communication device. By way of example, and not limitation, cell phones may be combined with electronic devices such as digital cameras and wireless communication devices such as a Blackberry™. The mobile device 112 may include any hardware and/or software necessary for operating and/or controlling the mobile device 112. For example, the mobile device 112 may include a processing portion that may be individual digital logic components, a processor, a microprocessor, and application-specific integrated circuit (ASIC), and the like. The processing portion may include memory such as random access memory, register memory, cache memory and the like. Memory may include computer executable attractions by which the processing portion may operate. For example, computer executable structures may include computer executable code that, when executed, operate the relevant actions associated with the processing portion.

Figure 2:
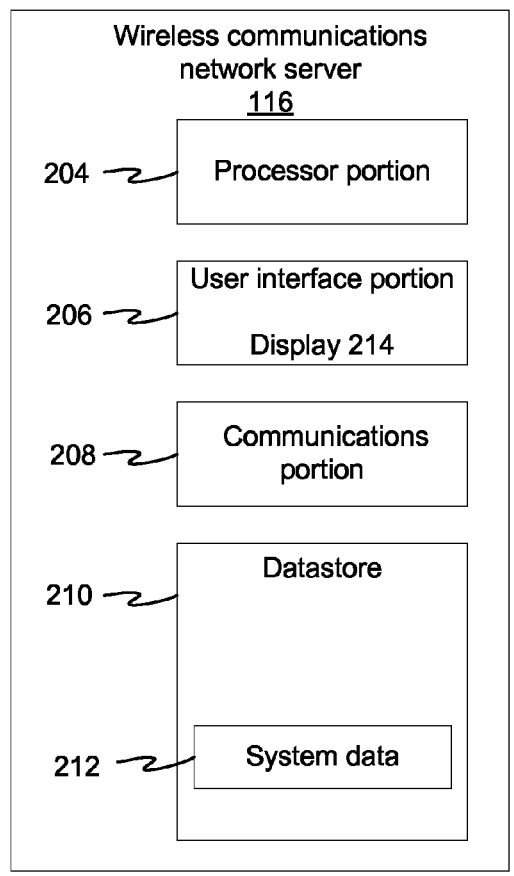
FIG. 2 depicts a block diagram of a wireless communication network server in which aspects of an embodiment may be implemented.

FIG. 2 depicts a block diagram of an example WCNS 116 which may be implemented in embodiments. The WCNS 116 may be implemented as, but is not limited to, a network server, a network controller, a network switch or any component, system and/or subsystem capable of operating as the WCNS 116 is described in any of the embodiments. The WCNS 116 may also be in combination with another component of the WCN 114, such as but not limited to the CMS 118. The WCNS 116 may include a processing portion 204, a user interface portion 206, a communications portion 208, and a datastore portion 210. The datastore portion 210 may have stored thereon system data 212. In addition, the WCNS 116 may be comprised of components (described in further detail below) that are distributed among one or more elements in the WCN 114 (i.e., a network server, a network controller, a network switch, or the like).

The processing portion 204 may include any hardware and/or software necessary for operating and/or controlling the user interface portion 206, the communications portion 208 and the datastore portion 210. For example, the processing portion 204 may be individual digital logic components, a processor, a microprocessor, and application-specific integrated circuit (ASIC), and the like. The processing portion 204 may include memory such as random access memory, register memory, cache memory and the like. Memory may include computer executable attractions by which the processing portion 204 may operate. For example, computer executable structures may include computer executable code that, when executed, operate the relevant actions associated with the processing portion 204. For example, the computer executable structure may operate the methods provided in FIG. 4, FIG. 4A, FIG. 4B, and FIG. 4C.

The processor may be in communication with the user interface portion 206, the communications portion 208 and/or the datastore portion 210. The processing portion 204 may control the user interface portion 206. For example, the processing portion 204 may direct the user interface portion 206 to output information visually, electronically and/or audibly, and the processing portion 204 may direct the user interface portion 206 to receive input from the user, perhaps through electronic means. The processing portion 204 may control the communications portion 208. For example, the processing portion 204 may send and/or receive data via the communications portion 208. The processing portion 204 may operate on the datastore 210 to detect events, invoke actions, apply exceptions, and/or receive overrides.

The user interface portion 206 may be, in any combination of hardware and/or software, any component, system and/or subsystem for receiving input from a user and outputting information to the user. The user interface portion 206 may include a display 214 and/or keyboard. The keyboard may be a numerical pad. For example, the user interface portion 206 may include a computer keypad, programmable softkeys, mechanical buttons, touch-screens, and/or the like. The user interface portion 206 may also include an electronic interface that may receive user instructions from the communications portion 208 that are sent from a remote location through the WCN 114, perhaps from the mobile device 112 or the personal computer 124. The display 214 may provide visual output and input, for example via a touch-screen. The user interface potion may include a speaker for audio output. The user interface portion 206 may include a microphone for audible input.

The communications portion 208 may be, in any combination of hardware and/or software, any component, system, and/or subsystem for providing communications to and/or from the WCNS 116. The communication provided by the communications portion 208 may include, but is not limited to an Internet 160 based connection, a wireless connection such as radio frequency for example, a telephone based dial-up connection and the like. The communications portion 208 may provide a wireless communications channel between the WCNS 116 and a peer device (not shown) and/or the WCN 114. The communications portion 208 may provide point-to-point wireless communications between the WCNS 116 and a peer device. The wireless communications portion 208 may provide radio frequency (RF) communications between the WCNS 116 and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+EDR, Institute of Electrical and Electronics Engineers, Inc. (IEEE) specification 802.15.1, or the like.

The communications portion 208 may also include individual digital logic components, a processor, a microprocessor, and application-specific integrated circuit (ASIC), and the like. The communications portion 208 may include memory such as random access memory, register memory, cache memory and the like. Memory may include computer executable attractions by which the communications portion 208 may operate. For example, computer executable structures may include computer executable code that, when executed, operate the relevant actions associated with the communications portion 208.

Figure 7:
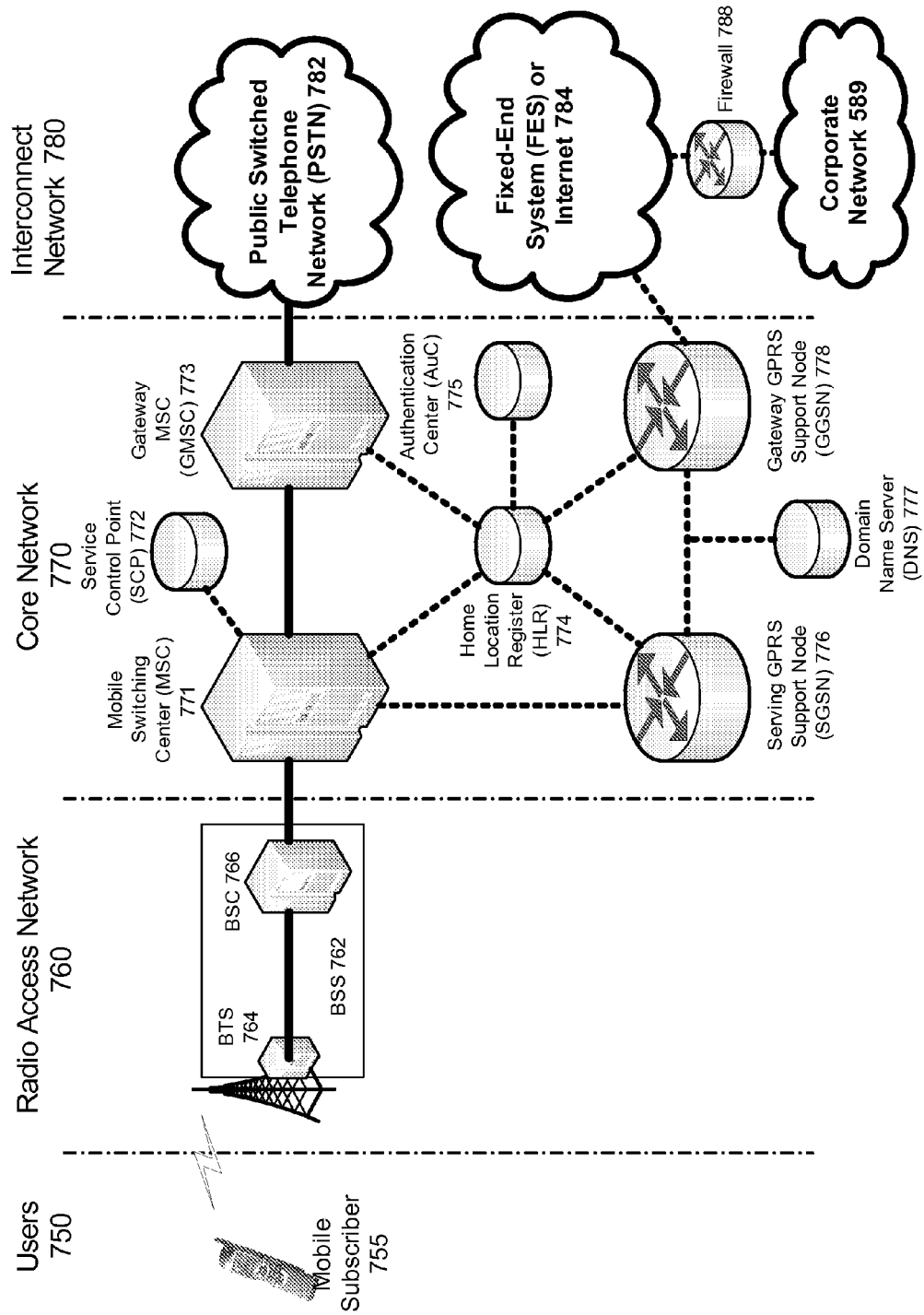
FIG. 7 depicts a GPRS network architecture in which aspects of an embodiment may be implemented.

The communications portion 208 may provide a wireless communications channel between the WCNS 116 and the WCN 114 such as the radio access network 760 (see FIG. 7). The communications portion 208 may provide cellular communications. The communication portion 208 may provide wireless data network communications such as, Wi-Fi (IEEE 802.11) and WiMAX (IEEE 802.16) for example.

The datastore 210 may be any component, system, and/or subsystem suitable for storing data. For example, the datastore portion 210 may include random access memory, flash memory, magnetic storage, and/or the like.

The datastore 210 may store thereon system data 212. The system data 212 may include contact information, e-mail data, spreadsheets, word processing data, task data, and/or the like.

The WCNS 116 typically includes a variety of computer readable media. Computer readable media can be any available media that can be accessed by the WCNS 116 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the WCNS 116.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The processor portion 204 includes computer storage media in the form of volatile and/or nonvolatile memory such as read-only memory (ROM) and random access memory (RAM). A basic input/output system (BIOS), containing the basic routines that help to transfer information between elements within the WCNS 116, such as during start-up, is typically stored in ROM. RAM typically contains data and/or program modules that are immediately accessible to and/or presently being operated on by the processor 204.

The WCNS 116 may also include other removable/non-removable, volatile/nonvolatile computer storage media. By way of example only, a hard disk drive may read from or write to non-removable, nonvolatile magnetic media; a magnetic disk drive may read from or write to a removable, nonvolatile magnetic disk; and an optical disk drive may read from or write to a removable, nonvolatile optical disk such as a CD-ROM or other optical media. Other removable/non-removable, volatile/nonvolatile computer storage media that may be used in the WCNS 116 include, but are not limited to, magnetic tape cassettes, flash memory cards, digital versatile disks, digital video tape, solid state RAM, solid state ROM, and the like.

Figure 3:
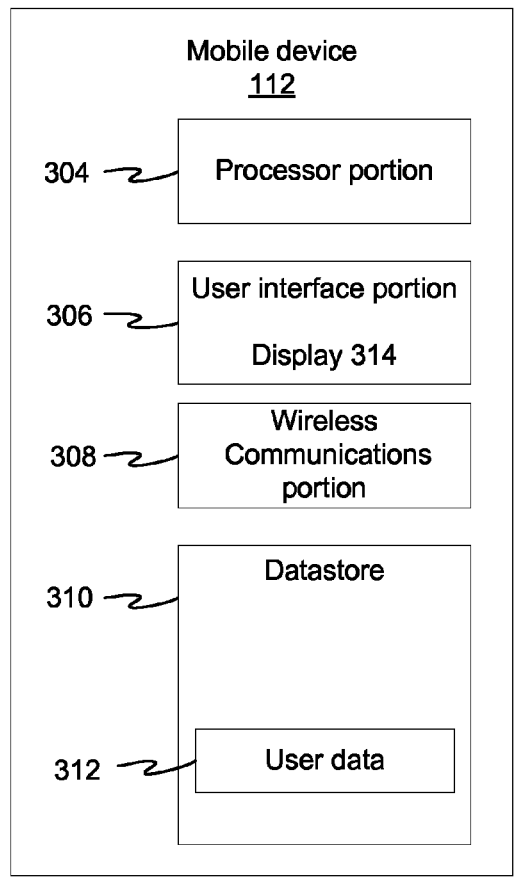
FIG. 3 depicts a block diagram of a mobile device in which aspects of an embodiment may be implemented.

FIG. 3 depicts a block diagram of an example mobile device 112 which may be implemented in embodiments. The mobile device 112 may include a processing portion 304, a user interface portion 306, a communications portion 308, and a datastore portion 310. The datastore portion 310 may have stored thereon user data 312.

The processing portion 304 may include any hardware and/or software necessary for operating and/or controlling the user interface portion 306, the wireless communications portion 308 and the datastore portion 310. For example, the processing portion 304 may be individual digital logic components, a processor, a microprocessor, and application-specific integrated circuit (ASIC), and the like. The processing portion 304 may include memory such as random access memory, register memory, cache memory and the like. Memory may include computer executable attractions by which the processing portion 304 may operate. For example, computer executable structures may include computer executable code that, when executed, operate the relevant actions associated with the processing portion 304.

The processor portion 304 may be in communication with the user interface portion 306, the wireless communications portion 308 and/or the datastore portion 310. The processing portion 304 may control the user interface portion 306. For example, the processing portion 304 may direct the user interface portion 306 to output information visually and/or audibly, and the processing portion 304 may direct the user interface portion 306 to receive input from the user. The processing portion 304 may control the wireless communications portion 308. For example, the processing portion 304 may send and/or receive data via the wireless communications portion 308. The processing portion 304 may operate on the datastore 310 to detect events, invoke actions, apply exceptions, and/or receive overrides.

The user interface portion 306 may be, in any combination of hardware and/or software, any component, system and/or subsystem for receiving input from a user and outputting information to the user. The user interface portion 306 may include a display 314 and/or keyboard. The keyboard may be a numerical pad. For example, the user interface portion 306 may include a telephone keypad, programmable softkeys, operators such as but not limited to mechanical buttons and other input/out devices, touch-screens, and/or the like. The display may provide visual output in input, for example via a touch-screen. The user interface potion 306 may include a speaker for audio output. The user interface portion 306 may include a microphone for audible input.

The wireless communications portion 308 may be, in any combination of hardware and/or software, any component, system, and/or subsystem for providing wireless communications to and/or from the mobile device 112. The wireless communications portion 308 may provide a wireless communications channel between the mobile device 112 and a peer device (now shown) or the WCN 114. The wireless communications portion 308 may provide point-to-point wireless communications between the mobile device 112 and a peer device. The wireless communications portion 308 may provide radio frequency (RF) communications between the device and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+EDR, Institute of Electrical and Electronics Engineers, Inc. (IEEE) specification 802.15.1, or the like.

The communications portion 308 may also include individual digital logic components, a processor, a microprocessor, and application-specific integrated circuit (ASIC), and the like. The communications portion 308 may include memory such as random access memory, register memory, cache memory and the like. Memory may include computer executable attractions by which the communications portion 308 may operate. For example, computer executable structures may include computer executable code that, when executed, operate the relevant actions associated with the communications portion 308.

The wireless communications portion 308 may provide a wireless communications channel between the mobile device 112 and the WCN 114 such as the radio access network 760 (see FIG. 7). The wireless communications portion 308 may provide a cellular communications. The wireless communication portion 308 may provide wireless data network communications such as, Wi-Fi (IEEE 802.11) and WiMAX (IEEE 802.16) for example.

The datastore 310 may be any component, system, and/or subsystem suitable for storing data. For example, the datastore portion 310 may include random access memory, flash memory, magnetic storage, and/or the like.

The datastore 310 may store thereon user data 312. The user data 312 may include contact information, e-mail data, spreadsheets, word processing data, task data, and/or the like. In an embodiment, the processor may invoke an action to delete and/or encrypt the user data 312.

Referring to FIG. 1, FIG. 2, FIG. 3, and FIG. 5, in an embodiment, the WCN 114 may be in wireless communication with the mobile device 112. The WCN 114 may include the CMS 118 and the WCNS 116 as part of the network. The CMS 118 and the WCNS 116 may be in communication with each other. The processor portion 204 or the communications portion 208 of the WCNS 116 may be configured to detect a call 132 to the mobile device 112 and also to determine an originator 134 of the call 132 to the mobile device 112. The processor portion 204 or the communications portion 208 of the WCNS 116 may also be configured to detect a call that is indicative of a call 132 to the mobile device 112. Processor portion 204 or the communications portion 208 may also be configured to determine a genre 136 of the call 132 to the mobile device 112. The determination of the genre 136 of the call 132 may be based at least in part on the originator 134 of the call 132. The processor portion 204 or the communications portion 208 may be also configured to compare the genre 136 of the call 132 to a predetermined blocked genre 138. In addition, the processor portion 204 or the communications portion 208 of the WCNS 116 may be configured to place the call 132 into communication with, or provided to, the CMS 118 based on the comparison of the genre 136 of the call 132 to the predetermined blocked genre 138. Alternatively, the processor portion 204 or the communications portion 208 of the WCNS 116 may be configured to terminate the call 132 based on the comparison of the genre 136 of the call 132 to the predetermined blocked genre 138. Alternatively, the processor portion 204 or the communications portion 208 of the WCNS 116 may be configured to store the call 132 based on the comparison of the genre 136 of the call 132 to the predetermined blocked genre 138. The call 132 could, by way of example and not limitation, be stored in the memory of the processor portion 204 or the communications portion 208 of the WCNS 116.

As depicted in FIG. 1, the processor portion 204 and the communications portion 208 of the WCNS 116 may be in communication with the Internet 160, and if so, the user 126 may configure the processor portion 204 and the communication portion 208 through a computer interface such as 124 that is also in communication with the Internet 160. The user 126 may also configure the WCNS 116 and the portions 204 and 208 through the mobile device 112.

An originator 134 may be determined via a number of ways, including but not limited to the identification corresponding to the call 132, a reverse look-up, information provided by the WCN 114, information provided by the user 126, or information provided by way of the Internet 160. Information provided by the way of the Internet 160 may be by way of the web-based "yellow pages", the web-based "white pages", or a social network or social networking website, among others. Such networks or websites may offer varied information about a number of things, persons, and organizations. By way of example and not limitation, a phone number may be identified (or "tagged") on such a network or website as being associated with a particular bank. Alternatively, the phone number may be identified more generally as a "banking" or "financial" originator. Therefore, if the bank calls a member of the social network from a telephone number like 888-111-1111, for example, that member may tag the phone number as "bank", "finance", "credit card", "savings", "loan", or the like.

Although a user's particular tags may be given priority over other member's tags, the tags of other members in the social network are available to other members as well (including the user 126). The processor portion 204 or communications portion 208 may be configured to access one or more social networks or websites and obtain information regarding the identified phone number or the originator 134 (if and/or when the originator 134 is identified). The user's 126 particular tags in the social network may identify the telephone number as being associated with the particular bank. However, the user 126 may not have the phone number tagged in any social networks and the majority of other user's of the social network(s) may have tagged the phone number as a "credit card." In such an instance, the processor portion 204 or communications portion 208 may report the phone number as a "credit card" originator 134. As will be discussed in further detail below, the processor portion 204 or communication portion 208 may be configured to classify such an originator 134 as originating a "financial" genre 136 call 132, for example.

In the circumstance that the phone number is relatively equally tagged by other members in the social network as perhaps a "credit card" and a "charity", then the processor portion 204 or the communications portion 208 may be configured to report that the originator 134 associated with the phone number is either a "credit card", or a "charity", or perhaps as a multiple source line. If the phone number can not be identified in the social network site, then the processor portion 204 or the communications portion 208 maybe configured to find other characteristics of the phone number to determine the genre 136 of the call 132.

Also, in an embodiment, the processor portion 204 or the communication portion 208 may be configured to access search engines such as but not limited to Google to identify one or more of websites associated with the phone number of the call 132 or the originator 134 of the call 132. In an embodiment, the top websites as identified by a search via a search engine may be evaluated for keywords, acronyms, and diction to determine who the originator 134 is for the call 132. In addition to using a websites' keywords, acronyms, and diction or a social network(s) to determine an originator 134, the processor portion 204 or the communication processor 208 may be configured to identify and use the websites' keywords, acronyms, and diction and/or a social network(s) to determine what genre 136 may be best associated with the call 132. Also, in addition to using the keywords, diction, and acronyms of a website and/or a social network(s) to determine a genre 136, the processor portion 204 or the communications portion 208 may be configured to use the websites' logos, advertisements, and hyperlinks or cross-references to other websites, and/or social network(s) to identify affiliations 144 of the call 132. The determination of an affiliation 144 of a call 132 may be useful in determining a genre 136 of the call 132. Further, the processor portion 204 or the communications portion 208 may be configured to use a websites' keywords, diction, acronyms, logos, advertisements, and hyperlinks to other websites and/or a social network(s) to determine one or more quantitative characteristics 152 and/or qualitative characteristics 154 that are related to a call 132. The quantitative characteristics 152 and/or the qualitative characteristics 154 may be useful in determining a genre 136 of the call 132. The determination of the genre 136, the affiliations 144, the quantitative characteristics 152, and the qualitative characteristics 154 will be discussed in more detail below.

In an embodiment, the predetermined blocked genre 138, may be determined by the user 126. The user 126 may identify in the predetermined blocked genre 138 one or more genres 136 that are not desirable. The predetermined blocked genre 138 may be considered a "blacklist" of sorts in that the genres 136 identified in the predetermined blocked genre 138 are genres 136 of calls 132 of which the user 126 does not wish to receive. Embodiments also contemplate that the predetermined blocked genre 138 may operate in cooperation with the user's 126 predetermined designated preference for call genres 166. In these embodiments, the user 126 may identify desirable or preferred genres. The predetermined designated preference for call genres 166 may be considered a "white list" of sorts in that the genres 136 identified in the predetermined designated preference for call genres 166 are genres 136 of calls 132 of which the user 126 wishes to receive. The genres 136 identified in the predetermined designated preference for call genres 166 may not be included in the predetermined blocked genre 138. In an embodiment, genres 136 for which the user 126 does not designate a preference may be included in the predetermined blocked genre 138.

In an embodiment, there may be no predetermined blocked genre 138 and there may only be the predetermined designated preference for call genres 166. Conversely, in an embodiment there may be no predetermined designated preference for call genres 166 and there may only be the predetermined blocked genre 138. Either the predetermined designated preference for call genres 166 or the predetermined blocked genre 138 may be referred to as predetermined genres. In an embodiment, the user 126 may configure the predetermined blocked genre 138 and/or the predetermined designated preference for call genres 166 may be configured by the user 126 via the mobile device 112 and/or the computing device 124 via the Internet 160.

The genre 136 of the call 132 may be characterized, or determined, by the nature of call 132 as considered from the viewpoint of the user 126, to whose mobile device 112 the call 132 is directed. The determination of the genre 136 of the call 132 may be considered in view of a number of factors, one possible factor being the originator 134 of the call 132. In an embodiment, the processor portion 204 or the communications portion 208 may be configured to determine the genre 136 of the call 132 as, by way of example and not limitation, a commercial call upon recognizing the originator 134 as a telemarketer, a retailer, a wholesaler, a commercial sales organization, or the like. The processor portion 204 or the communications portion 208 may also be configured to determine the genre 136 of the call 132 as a charitable call upon recognizing the originator 134 as a charity. The processor portion 204 or the communications portion 208 may also be configured to determine the genre 136 of the call 132 as a political call upon recognizing the originator 134 as a political party, a politician, a political interest group, or a political campaign, or the like.

In addition, the processor portion 204 or the communications portion 208 may be configured to determine the genre 136 of the call 132 as a professional call upon recognizing the originator 134 as a doctor, dentist, engineer, accountant, lawyer, or other licensed professional. The processor portion 204 or the communications portion 208 may also be configured to determine the genre 136 of the call 132 as a personal call upon recognizing the originator 134 as an individual, or a residential-based caller. It is also possible that, despite any configuration, the processor portion 204 or the communications portion 208 may not be able to determine the genre 136 of the call 132. In such a case, the processor portion 204 or the communications portion 208 may be configured to determine the genre 136 of the call 132 as unclassifiable. All of the previously listed genre 136 determinations are examples and other genre 136 determinations made in consideration of the originator 134 are contemplated.

In an embodiment, the determination of the genre 136 of the call 132 may be based in part on the user's 126 designation of the originator 134 as a blocked originator. The user 126 may designate a particular originator 134 as a blocked originator by identifying the particular originator 134 to the WCNS 116 via the user interface 306 of the mobile device 112.

In an embodiment, the determination of the genre 136 of the call 132 may include a determination of an affiliation 144 of the originator 134 of the call 132 by the processor portion 204 or the communications portion 208. The genre 136 determination may also include a determination by the processor portion 204 or the communications portion 208 of the time of day 146 at which the call was made. The genre 136 determination may also include a classification 148 of the genre 136 of the call 132 by the processor portion 204 or the communications portion 208. The classification 148 of the genre 136 may be based at least in part on the originator 134 and/or the affiliation 144 and/or the time of day 146. The classification 148 may correspond to a predetermined genre category 150. The predetermined genre category 150 may include, but is not limited to, the aforementioned commercial, charitable, political, professional, personal, or unclassifiable call genres.

The determination of the affiliation 144 of the originator 134 may, by way of example and not limitation, be determined by an identification 156, by the processor portion 204 or the communications portion 208, of persons, organizations, or credentials associated or affiliated with the originator 134. By way of example and not limitation, the identification 156 may include identifying the originator's 134 sponsor, owner, client, employer, partner, endorser, credentials, or the like. An affiliation 144 of the originator 134 may be determined via a number of ways, including but not limited to information provided by the WCN 114, information provided by the user 126, or information provided by way of the Internet 160 (as was discussed previously). By way of example and not limitation, a call 132 from an originator 134 who is a doctor that has an affiliation 144 of a sponsor who is a noted national medical association may be determined to be a professional genre 136.

Further, the processor 204 or the communications portion 208 may be configured to determine a genre 136 of the call 132 based in part on the time of day 146 which the call 132 was made to the mobile device 112. By way of example and not limitation, a call received at the dinner hour may be determined to be a commercial call based on the inclination of telemarketers to call potential customers at that time of day.

In an embodiment, the determination of the genre 136 of the call 132 may also include a determination by the processor portion 204 or the communications portion 208 of one or more of a quantitative characteristic 152 or a qualitative characteristic 154 of either the originator 134 of the call 132 or the affiliation 144 of the originator 134. The classification 148 of the genre 136 of the call 132 may be based at least in part on the quantitative characteristic 152 and/or the qualitative characteristic 154. By way of example and not limitation, a quantitative characteristic 152 of the originator 134 may be, in the case of a telemarketing originator 134, a numerical position on a compiled list of largest or most profitable corporations.

In the case of an accountant originator 134 for example, a quantitative characteristic 152 of the originator 134 may be the number of professional's employees. In the case of a political party originator 134 for example, a quantitative characteristic 152 may be the number of persons registered in a state or a country as a member of that political party. In the case of a charitable solicitation originator 134 for example, a quantitative characteristic 152 may be the amount of money raised by that charity in a given year. In the case of an individual originator 134, a quantitative characteristic 152 may be the number of times the individual originator 134 has contacted the user 126 in a given period of time, perhaps the past year for example.

By way of example and not limitation, a qualitative characteristic 154 for a telemarketing originator 134 may be a customer service rating of "excellent", "below average", or "above average", etc., given by one or more organizations that monitor and rate corporations' customer satisfaction. In the case of an accountant originator 134 for example, a qualitative characteristic 154 may be a rating of "qualified", "unqualified", "very qualified" or "extremely qualified", etc., given by an organization that provides ratings of professional expertise in general or in specific endeavors. In the case of a political party originator 134 for example, a qualitative characteristic 154 my be a rating of "green", "eco-friendly", "environmentally irresponsible", or "environmentally sound", etc., given by one or more organizations that monitor and critique political parties' environmental platforms.

In the case of a charitable solicitation originator 134 for example, a qualitative characteristic 154 may be a rating of "one star", "three stars", "four stars", etc., given by one or more organizations that monitor and rate the responsibility and effectiveness of charitable organizations. In the case of an individual originator 134 for example, a qualitative characteristic 154 may be the gender of the individual originator 134, or any other personal qualitative information available regarding the individual originator 134.

Although the examples of quantitative characteristics 152 and qualitative characteristics 154 above were presented for originators 134, the same examples may apply to affiliations 144 of the originators 134, such as but not limited to sponsors, owners, clients, employers, partners, endorsers, or credentials of the originator 134.

Quantitative characteristics 152 and qualitative characteristics 154 may be determined by the processor portion 204 or the communications portion 208 via a number of ways, including but not limited to information provided by the WCN 114, information provided by the user 126, or information provided by way of the Internet 160 (as was discussed previously).

In an embodiment, the processor 204 or the communications portion 208 of the WCNS 116 may be configured to consider one or more of the quantitative characteristics 152 and/or the qualitative characteristics 154 in determining the genre 136 of the call 132. By way of example and not limitation, a call 132 from a charitable solicitation originator 134 with a corresponding quantitative characteristic 152 of $1,000,000 raised in the last year and/or a corresponding qualitative characteristic 154 of "four stars" may have a determined genre 136 of preferred charitable. Such ratings for charities may be found at websites like http://charityguide.org/volunteer/charityratings.htm, for example. In an embodiment, the predetermined genre category 150 may include one or more of a preferred commercial, a preferred charitable, a preferred political, a preferred professional, or a preferred personal. The "preferred" status of the genre 136 may be determined by the processor portion 204 or the communications portion 208 based on one or more quantitative characteristics 152 or qualitative characteristics 154 of the call 132, for example.

In an embodiment, the CMS 118 may be configured to record the header information 140 for the call 132 and the header information 140 may include an attribute 142 corresponding to the genre 136 of the call 132. The processor portion 204 or the communications portion 208 of the WCNS 116 may be configured to write the genre 136 of the call 132 into the attribute 142 upon the call 132 being placed into communication with the CMS 118. The attribute 142 corresponding to the genre 136 of the call 132 may be searchable from the display 314 configured in the mobile device 112.

In an embodiment, the CMS 118 may be configured to place the call 132 into communication with the FPM 120. Alternatively, the CMS 118 may also be configured to place the call 132 into communication with the SPM 122. There may be any number of predetermined messages with which the CMS 118 may place the call 132 into communication upon receiving the call 132 from the WCN 114 or the WCNS 116. The FPM 120, the SPM 122, or any predetermined message may correspond to one or more of the predetermined blocked genre 138. The FPM 120 or SPM 122 may inform the originator 134 that the user 126 is not available at the time to engage with the call 132. The FPM 120 or SPM 122 may also inform the originator 134 that the user 126 does not wish to communicate with the call 132 and encourage the originator 134 to not contact the user 126 again, or the like. The FPM 120 or SPM 122 may be a default WCN 114 or CMS 118 message or may be a message personally recorded by the user 126. A personally recorded FPM 120 or SPM 122 may convey any information the user 126 wishes to communicate to an originator 134 of the call 132. The CMS 118 may be configured to put an originator 134 specific FPM 120 or SPM 122 in communication with the call 132. The FPM 120 or SPM 122 may be stored in the datastore 210 as system data 212. Alternatively, the FPM 120 or SPM 122 may be stored in the memory of the processor portion 204. Also, the FPM 120 or SPM 122 may be implemented in a distinct component of the WCN 114, or the like.

In an embodiment, WCN 114 may be in communication with the mobile device 112 and may include the CMS 118 and the WCNS 116, which may be in communication with each other. The CMS 118 may be configured to record header information 140 for the call 132. The header information 140 may include the attribute 142 corresponding to a genre 136 of the call 132. The processor portion 204 or the communications portion 208 of the WCNS 116 may be configured to detect the call 132 to the mobile device 112 and determine the originator 134 of the call 132 to the mobile device 112. The processor portion 204 or the communications portion 208 may also be configured to detect a call indicative of the call 132 to the mobile device 112. The processor portion 204 or the communications portion 208 may also be configured to determine the genre 136 of the call 132 to the mobile device 112. The determination of the genre 136 of the call 132 may be based in part on the originator 134 of the call 132. The processor portion 204 or the communications portion 208 of the WCNS 116 may also be configured to place the call 132 into communication with, or provide the call 132 to, the CMS 118 upon a determination that the user 126 does not receive the call 132 within the predetermined period of time 158. The processor portion 204 or the communications portion 208 of the WCNS 116 may also be configured to write the genre 136 of the call 132 into the attribute 142 upon the call 132 being placed into communication with, or provided to, the CMS 118.

Figure 4:
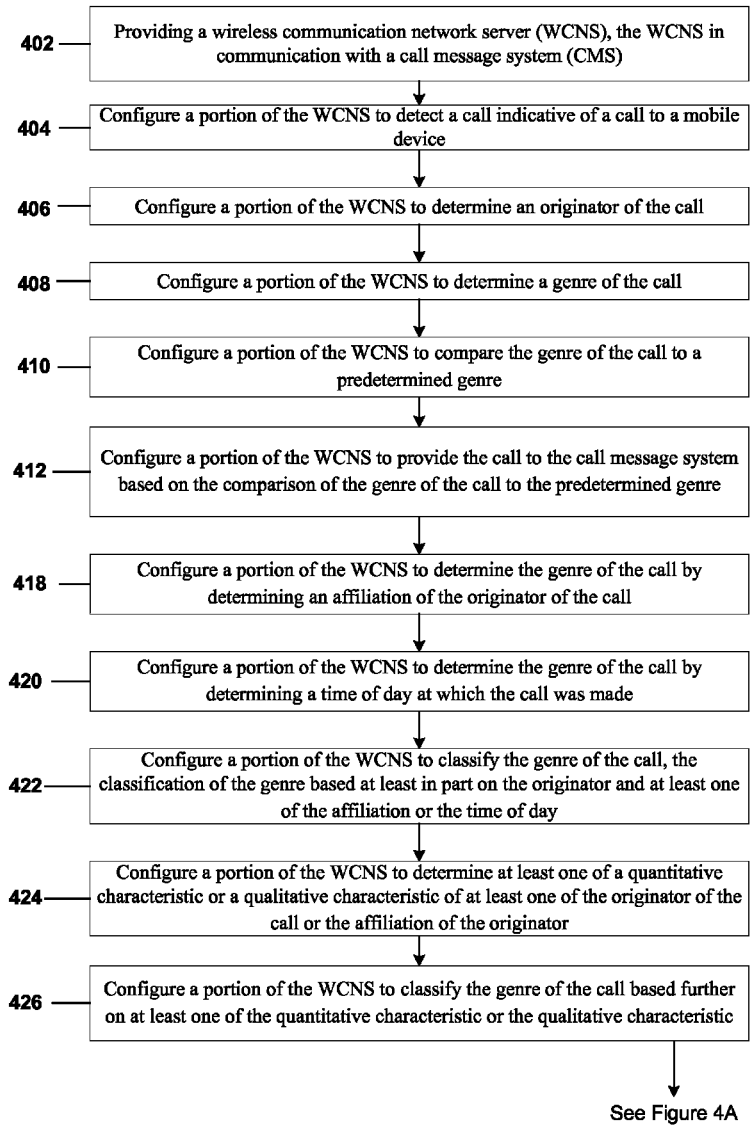
FIG. 4 depicts a process in which aspects of an embodiment may be implemented.
Figure 4A:
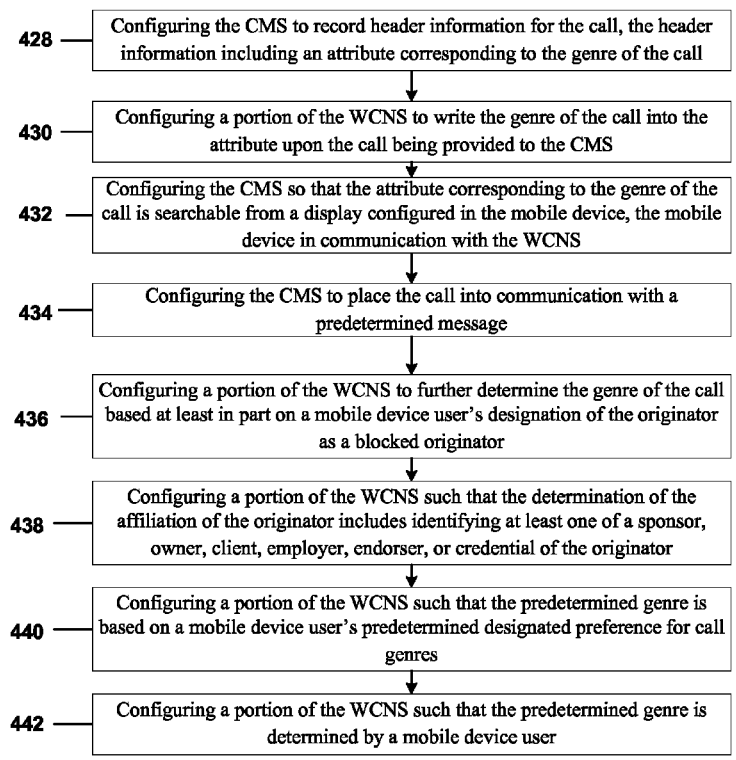
FIG. 4A depicts a continuation of the process described in FIG. 4.

FIG. 4 and FIG. 4A illustrate a flow chart of an illustrative embodiment for configuring a wireless communication network, such as but not limited to WCN 114. Referring to FIG. 4 and FIG. 4A, as well as FIG. 1 to FIG. 3 and FIG. 5, in an embodiment, the WCNS 116 may be provided in step 402 that may be in wireless communication with the CMS 118. Alternatively, as seen in FIG. 4C, in step 401, the WCNS 116 may be provided solely. In step 404, the processor portion 204 or the communications portion 208 of the WCNS 116 may be configured to detect a call indicative of a call 132 to the mobile device 112. In step 406, the processor portion 204 or the communications portion 208 of the WCNS 116 may be configured to determine an originator 134 of the call 132. In step 408, the processor 204 or the communications portion 208 of the WCNS 116 may be configured to determine a genre 136 of the call 132. The determination of the genre 136 of the call 132 may be based at least in part on the originator 134 of the call 132.

As part of step 408, the genre 136 of the call 132 may be characterized, or determined, by the nature of call 132 as considered from the viewpoint of the user 126, to whose mobile device 112 the call 132 is directed. The determination of the genre 136 of the call 132 may be considered in view of a number of factors, one possible factor being the originator 134 of the call 132. In an embodiment, the processor portion 204 or the communications portion 208 of the WCNS 116 may be configured to determine the genre 136 of the call 132 as, by way of example and not limitation, a commercial call upon recognizing the originator 134 as a telemarketer, a retailer, a wholesaler, a commercial sales organization, or the like. The processor 204 or the communications portion 208 may also be configured to determine the genre 136 of the call 132 as a charitable call upon recognizing the originator 134 as a charity. The processor portion 204 or the communications portion 208 may also be configured to determine the genre 136 of the call 132 as a political call upon recognizing the originator 134 as a political party, a politician, a political interest group, or a political campaign, or the like.

In addition, the processor portion 204 or the communications portion 208 may be configured to determine the genre 136 of the call 132 as a professional call upon recognizing the originator 134 as a doctor, dentist, engineer, accountant, lawyer, or other licensed professional. The processor portion 204 or the communications portion 208 may also be configured to determine the genre 136 of the call 132 as a personal call upon recognizing the originator 134 as an individual, or a residential-based caller. It is also possible that, despite any configuration, the processor portion 204 or the communications portion 208 may not be able to determine the genre 136 of the call 132. In such a case, the processor portion 204 or the communications portion 208 may be configured to determine the genre 136 of the call 132 as unclassifiable. All of the previously listed genre 136 determinations of step 408 are examples and other genre 136 determinations made in consideration of the originator 134 are contemplated.

In step 410, the processor portion 204 or the communications portion 208 may be configured to compare the genre 136 of the call 132 to a predetermined blocked genre 138. In step 412, the processor portion 204 or the communications portion 208 of the WCNS 116 may be configured to place the call 132 into communication with the CMS 118 based on the comparison of the genre 136 of the call 132 to the predetermined blocked genre 138. Alternatively, as seen in FIG. 4C, in step 416 the processor portion 204 or the communications portion 208 of the WCNS 116 may be configured to terminate the call 132 or to store the call 132 based on the comparison of the genre 136 of the call 132 to the predetermined blocked genre 138.

In step 418, the processor portion 204 or the communications portion 208 of the WCNS 116 may be configured to determine the genre 136 of the call 132 by determining an affiliation 144 of the originator 134 of the call 132 (as was discussed previously). In step 420, the processor portion 204 or the communications portion 208 of the WCNS 116 may be configured such that the genre 136 determination may also include a determination of the time of day 146 at which the call was made.

Further, as part of step 420, the processor portion 204 or the communications portion 208 may be configured to determine a genre 136 of the call 132 based in part on the time of day 146 which the call 132 was made to the mobile device 112. By way of example and not limitation, a call received at the dinner hour may be determined to be a commercial call based on the inclination of telemarketers to call potential customers at that time of day.

In step 422, the genre 136 determination may also include a classification 148, by the processor portion 204 or the communications portion 208, of the genre 136 of the call 132. The classification 148 of the genre 136 may be based at least in part on the originator 134 and/or the affiliation 144 and/or the time of day 146. The classification 148 may correspond to a predetermined genre category 150. The predetermined genre category 150 may include, but is not limited to, the aforementioned commercial, charitable, political, professional, personal, or unclassifiable call genres.

In step 424, the processor portion 204 or the communications portion 208 of the WCNS 116 may be configured to determine one or more of a quantitative characteristic 152 or a qualitative characteristic 154 of either the originator 134 of the call 132 or the affiliation 144 of the originator 134. In step 426, the processor portion 204 or the communications portion 208 of the WCNS 116 may be configured to classify 148 the genre 136 of the call 132 based at least in part on the quantitative characteristic 152 and/or the qualitative characteristic 154. By way of example and not limitation, a quantitative characteristic 152 of the originator 134 may be, in the case of a telemarketing originator 134, a numerical position on a compiled list of largest or most profitable corporations.

In the case of an accountant originator 134 for example, a quantitative characteristic 152 of the originator 134 may be the number of professional's employees. In the case of a political party originator 134 for example, a quantitative characteristic 152 may be the number of persons registered in a state or a country as a member of that political party. In the case of a charitable solicitation originator 134 for example, a quantitative characteristic 152 may be the amount of money raised by that charity in a given year. In the case of an individual originator 134, a quantitative characteristic 152 may be the number of times the individual originator 134 has contacted the user 126 in a given period of time, perhaps the past year for example.

By way of example and not limitation, a qualitative characteristic 154 for a telemarketing originator 134 may be a customer service rating of "excellent", "below average", or "above average", etc., given by one or more organizations that monitor and rate corporations' customer satisfaction. In the case of an accountant originator 134 for example, a qualitative characteristic 154 may be a rating of "qualified", "unqualified", "very qualified" or "extremely qualified", etc., given by an organization that provides ratings of professional expertise in general or in specific endeavors. In the case of a political party originator 134 for example, a qualitative characteristic 154 my be a rating of "green", "eco-friendly", "environmentally irresponsible", or "environmentally sound", etc., given by one or more organizations that monitor and critique political parties' environmental platforms.

In the case of a charitable solicitation originator 134 for example, a qualitative characteristic 154 may be a rating of "one star", "three stars", "four stars", etc., given by one or more organizations that monitor and rate the responsibility and effectiveness of charitable organizations. In the case of an individual originator 134 for example, a qualitative characteristic 154 may be the gender of the individual originator 134, or any other personal qualitative information available regarding the individual originator 134.

Although the examples of quantitative characteristics 152 and qualitative characteristics 154 above were presented for originators 134, the same examples may apply to affiliations 144 of the originators 134, such as but not limited to sponsors, owners, clients, employers, partners, endorsers, or credentials of the originator 134.

Quantitative characteristics 152 and qualitative characteristics 154 may be determined via a number of ways, including but not limited to information provided by the WCN 114, information provided by the user 126, or information provided by way of the Internet 160 (as discussed previously).

As stated above, in the step 426, the processor portion 204 or the communications portion 208 of the WCNS 116 may be configured to consider one or more of the quantitative characteristics 152 and/or the qualitative characteristics 154 in determining the genre 136 of the call 132. By way of example and not limitation, a call 132 from a charitable solicitation originator 134 with a corresponding quantitative characteristic 152 of $1,000,000 raised in the last year and/or a corresponding qualitative characteristic 154 of "four stars" may have a determined genre 136 of preferred charitable. In an embodiment, the predetermined genre category 150 may include one or more of a preferred commercial, a preferred charitable, a preferred political, a preferred professional, or a preferred personal.

In step 428, the CMS 118 may be configured to record the header information 140 for the call 132 and the header information 140 may include an attribute 142 corresponding to the genre 136 of the call 132. In step 430, the processor portion 204 or the communications portion 208 of the WCNS 116 may be configured to write the genre 136 of the call 132 into the attribute 142 upon the call 132 being placed into communication with the CMS 118. In step 432, the processor portion 204 or the communications portion 208 of the WCNS 116 may be configured so that the attribute 142 corresponding to the genre 136 of the call 132 may be searchable from the display 314 configured in the mobile device 112.

In step 434, the CMS 118 may be configured to place the call 132 into communication with the FPM 120. Alternatively, the CMS 118 may also be configured to place the call 132 into communication with the SPM 122. There may be any number of predetermined messages with which the CMS 118 may place the call 132 into communication upon receiving the call 132 from the WCN 114 or the WCNS 116. The FPM 120, the SPM 122, or any predetermined message may correspond to one or more of the predetermined blocked genre 138. The FPM 120 or SPM 122 may inform the originator 134 that the user 126 is not available at the time to engage with the call 132. The FPM 120 or SPM 122 may also inform the originator 134 that the user 126 does not wish to communicate with the call 132 and encourage the originator 134 to not contact the user 126 again, or the like. The FPM 120 or SPM 122 may be a default WCN 114 or CMS 118 message or may be a message personally recorded by the user 126. A personally recorded FPM 120 or SPM 122 may convey any information the user 126 wishes to communicate to an originator 134 of the call 132. The CMS 118 may be configured to put an originator 134 specific FPM 120 or SPM 122 in communication with the call 132. The FPM 120 or SPM 122 may be stored in the datastore 210 as system data 212. Alternatively, the FPM 120 or SPM 122 may be stored in the memory of the processor portion 204. Also, the FPM 120 or SPM 122 may be implemented in a distinct component of the WCN 114, or the like.

In step 436, the determination of the genre 136 of the call 132, by the processor portion 204 or the communications portion 208, may be based in part on the user's 126 designation of the originator 134 as a blocked originator. The user 126 may designate a particular originator 134 as a blocked originator by identifying the particular originator 134 to the WCNS 116 via the user interface 306 of the mobile device 112.

In step 438, the processor portion 204 or the communications portion 208 of the WCNS 116 may be configured such that the determination of the affiliation 144 of the originator 134 may be determined by an identification 156 of persons, organizations, or credentials associated or affiliated with the originator 134. By way of example and not limitation, the identification 156 may include identifying the originator's 134 sponsor, owner, client, employer, partner, endorser, credentials, or the like. An affiliation 144 of the originator 134 may be determined via a number of ways, including but not limited to information provided by the WCN 114, information provide by the user 126, or information provided by way of the Internet 160 (as was discussed previously). By way of example and not limitation, a call 132 from an originator 134 who is a doctor that has an affiliation 144 of a sponsor who is a noted national medical association may be determined to be a professional genre 136.

In step 440, the processor portion 204 or the communications portion 208 may be configured such that the predetermined blocked genre 138 may be based on the user's 126 predetermined designated preference for call genres 166. In these embodiments, the user 126 may identify desirable or preferred genres and such predetermined designated preferred call genres 166 may not be included in the predetermined blocked genre 138. Genres 136 for which the user 126 does not designate a preference may be included in the predetermined blocked genre 138. Alternatively, in step 442, the processor portion 204 or the communications portion 208 may be configured such that the predetermined blocked genre 138 may be determined by the user 126. The user 126 may identify in the predetermined blocked genre 138 one or more genres 136 that are not desirable.

Figure 4B:
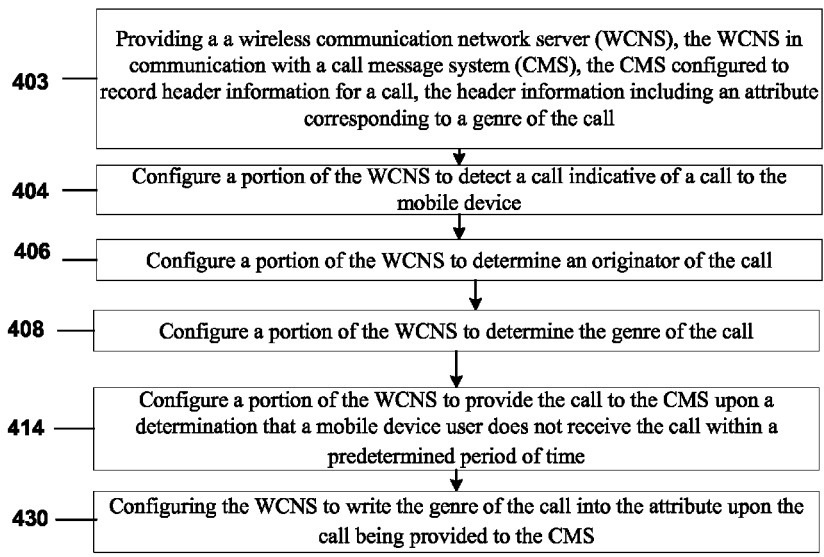
FIG. 4B depicts a process in which aspects of an alternate embodiment may be implemented.
Figure 4C:
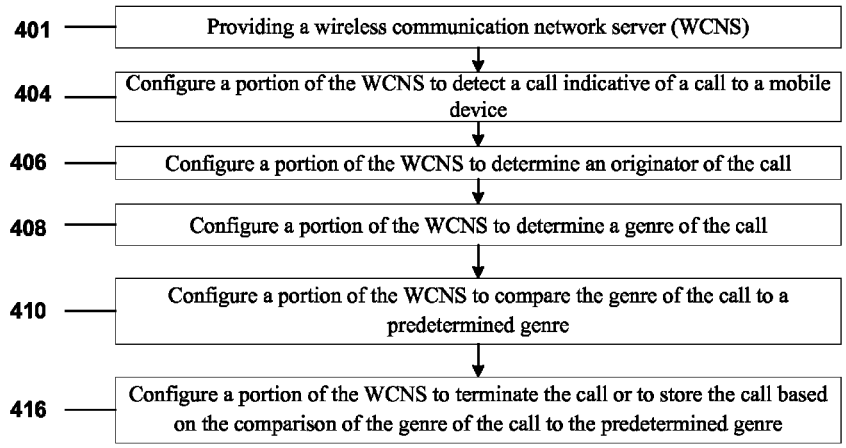
FIG. 4C depicts a process in which aspects of another alternate embodiment may be implemented.

Referring to FIG. 4B, in an alternate embodiment, in step 403, the WCNS 116 may be provided in which the WCNS 116 may be in communication with the CMS 118. The CMS 118 may be configured to record header information 140 for the call 132. The header information 140 may include the attribute 142 corresponding to a genre 136 of the call 132. As stated above, in step 404, the processor portion 204 or the communications portion 208 of the WCNS 116 may be configured to detect a call indicative of a call 132 to mobile device 112. Also as stated above, in step 406, the processor portion 204 or the communications portion 208 of the WCNS 116 may be configured to determine the originator 134 of the call 132. In step 408, the processor portion 204 or the communications portion 208 of the WCNS 116 may also be configured to determine the genre 136 of the call 132. The determination of the genre 136 of the call 132 may be based in part on the originator 134 of the call 132. In step 414, the processor portion 204 or the communications portion 208 of the WCNS 116 may be configured to place the call 132 into communication with the CMS 118, or provide the call 132 to the CMS 118, upon a determination that the user 126 does not receive the call 132 within the predetermined period of time 158. Also as discussed above, in step 430, the processor portion 204 or the communications portion 208 of the WCNS 116 may also be configured to write the genre 136 of the call 132 into the attribute 142 upon the call 132 being placed into communication with the CMS 118.

The following description sets forth some exemplary telephony radio networks and non-limiting operating environments for the wireless communications system (WCN) 110. The below-described operating environments should be considered non-exhaustive, however, and thus the below-described network architectures merely show how the above described embodiments of the WCNS 116 and/or the mobile device 112 may be incorporated into existing network structures and architectures. It can be appreciated, however, that the above described embodiments of the WCNS 116 and/or the mobile device 112 can be incorporated into existing and future alternative architectures for wireless communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the above described embodiments of the WCNS 116 and/or the mobile device 112 can be applied independently of the method for data transport, and do not depend on any particular network architecture, or underlying protocols.

Figure 6:
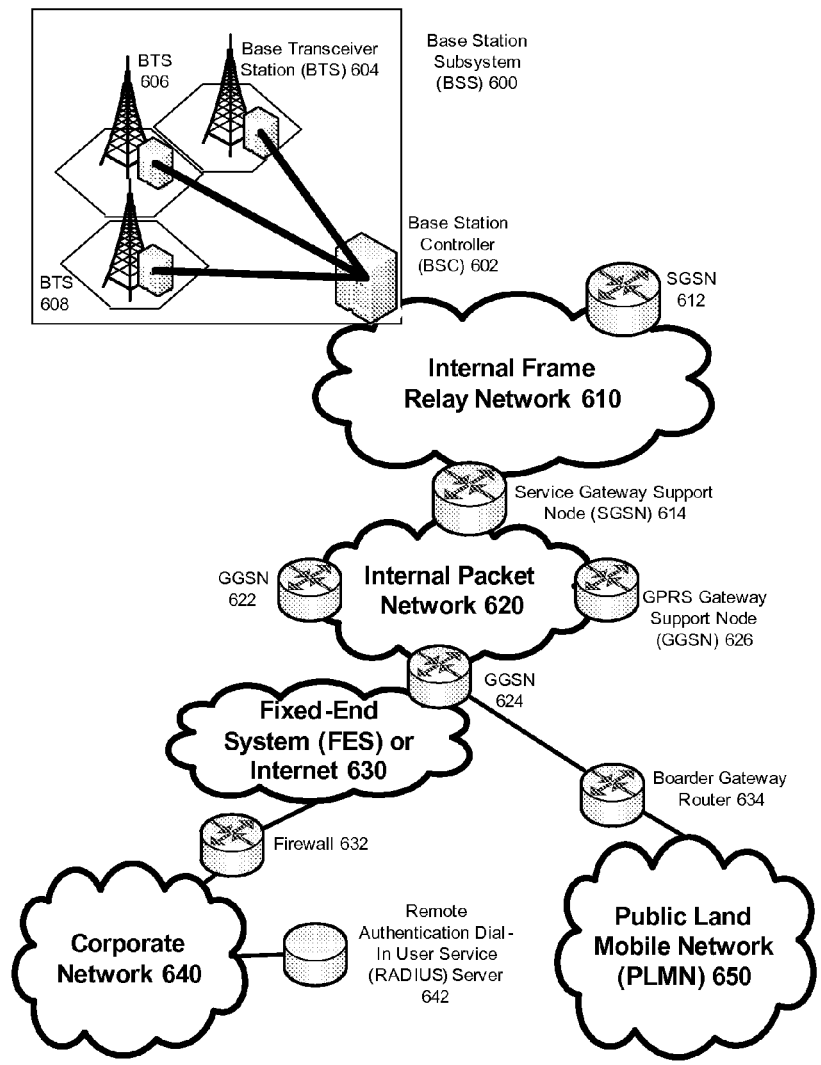
FIG. 6 depicts an overview of a network environment in which aspects of an embodiment may be implemented.

FIG. 6 depicts an overall block diagram of an exemplary packet-based mobile cellular network environment, such as a GPRS network, in which the system for implementing a configuration of the above wireless communication system 110 can be practiced. In an example configuration, the above described embodiments of the WCNS 116 are encompassed by elements of the network environment depicted in FIG. 6. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In exemplary fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630 (or the Internet 160). As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

FIG. 7 illustrates an architecture of a typical GPRS network as segmented into four groups: users 750, radio access network 760, core network 770, and interconnect network 780. In an example configuration the wireless communication system 110, the system is encompassed by the radio access network 760, core network 770, and interconnect network 780. Users 750 comprise a plurality of end users (though only mobile subscriber 755 is shown in FIG. 7). In an example embodiment, the device depicted as mobile subscriber 755 could comprise the user 126 and/or the mobile device 112. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784 (or the Internet 160), firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, like the above describer end user 126, and sometimes to the actual portable device, such as the above described mobile device 112, used by an end user of the mobile cellular service. Different element numbers may be used. When a mobile subscriber turns on his or her mobile device, the mobile device goes through an attach process by which the mobile device attaches to an SGSN of the GPRS network. In FIG. 7, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 (or the Internet 160) and firewall 788, to reach corporate network 789.

Thus, network elements that can invoke the functionality of the above described wireless communication system 110 and the embodiments of the WCNS 116 and/or the mobile device 112 can include but are not limited to Gateway GPRS Support Node tables, Fixed End System router tables, firewall systems, VPN tunnels, and any number of other network elements as required by the particular digital network.

Figure 8:
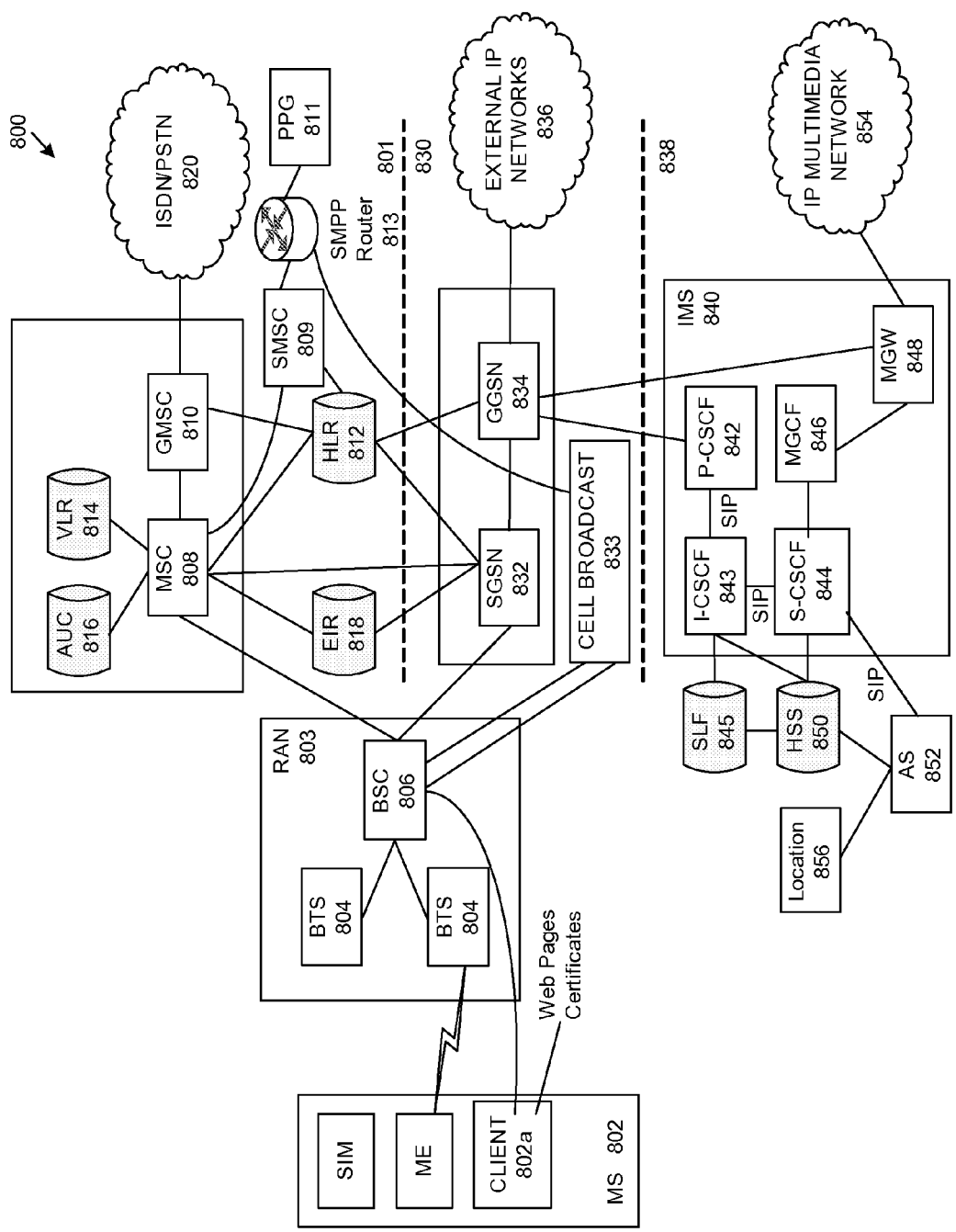
FIG. 8 depicts an alternate block diagram of an example GSM/GPRS/IP multimedia network architecture in which aspects of an embodiment may be implemented.

FIG. 8 illustrates another exemplary block diagram view of a GSM/GPRS/IP multimedia network architecture 800 in which the above described embodiments of the WCNS 116 and/or the mobile device 112 can be incorporated. As illustrated, architecture 800 of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The WCNS 116 could be implemented in the BSC 806. The MS 802 is physical equipment or Mobile Equipment (ME), such as a mobile phone (such as mobile device 112) or a laptop computer that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNS) 820. Thus, the GMSC 810 provides inter-working functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides inter-working functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed is:

1. A network component comprising hardware, the network component in communication with a call message system, the network component comprising:
   a communications portion configured to:
      detect a call indicative of a call to a mobile device; and
   a processor portion configured to:
      determine an originator of the call;
      determine a genre of the call based at least in part on:
         the originator of the call;
         a qualitative characteristic of the originator of the call, the qualitative characteristic comprising at least one of:
            an environmental rating; or
            a charitable rating; and
         a quantitative characteristic of the originator of the call, the quantitative characteristic comprising at least one of:
            a number of persons registered as members of a political party;
            an amount of money raised for a charity; or
            a number of times the originator of the call has called the mobile device;
      compare the genre of the call to a predetermined genre; and
      provide the call to the call message system based on the comparison of the genre of the call to the predetermined genre.

2. The network component of claim 1, wherein the call message system is configured to record header information for the call, the header information including an attribute corresponding to the genre.

3. The network component of claim 2, the processing portion further configured to write the genre of the call into the attribute upon the call being provided to the call message system.

4. The network component of claim 3, the network component in communication with the mobile device and wherein the attribute corresponding to the genre of the call is searchable from a display configured in the mobile device.

5. The network component of claim 1, wherein the call message system is configured to place the call into communication with a predetermined message.

6. The network component of claim 5, wherein the predetermined message corresponds to the predetermined genre.

7. The network component of claim 1, wherein the predetermined genre is determined by a mobile device user.

8. The network component of claim 1, wherein the determination of the genre of the call comprises:
  a determination of an affiliation of the originator of the call;
  a determination of a time of day at which the call was made; and
  a classification of the genre of the call, the classification of the genre based at least in part on the originator and at least one of the affiliation or the time of day,
  wherein the classification corresponds to a predetermined genre category.

9. The network component of claim 8, wherein the determination of the genre of the call further includes:
  the affiliation of the originator, wherein the classification of the genre of the call is further based on the quantitative characteristic.

10. The network component of claim 1, wherein the predetermined genre is based on a mobile device user's predetermined designated preference for call genres.

11. The network component of claim 1, wherein the determination of the genre of the call is further based at least in part on a designation of the originator as a blocked originator.

12. A network component comprising hardware, the network component comprising:
  a communications portion configured to:
    detect a call indicative of a call to a mobile device; and
  a processor portion configured to:
    determine an originator of the call;
    determine a genre of the call based at least in part on:
      the originator of the call;
      a quantitative characteristic of the originator of the call, the quantitative characteristic comprising at least one of:
        a number of persons registered as members of a political party;
        an amount of money raised for a charity; or
        a number of times the originator of the call has called the mobile device; and
      a qualitative characteristic of the originator of the call, the qualitative characteristic comprising at least one of:
        an environmental rating; or
        a charitable rating;
    provide the call to the call message system upon a determination that a mobile device user does not receive the call within a predetermined period of time; and
    write the genre of the call into an attribute upon the call being provided to the call message system.

13. The network component of claim 12, the network component in communication with the mobile device, and wherein the attribute corresponding to the genre of the call is searchable from a display configured in the mobile device.

14. A method of configuring a network component, the method comprising:
  configuring a communications portion of the network component to detect a call indicative of a call to a mobile device;
  configuring a processor portion of the network component to:
  determine an originator of the call;
  determine a genre of the call based at least in part on:
    the originator of the call;
    a qualitative characteristic of the originator of the call, the qualitative characteristic comprising at least one of:
      an environmental rating; or
      a charitable rating; and
    a quantitative characteristic of the originator of the call, the quantitative characteristic comprising at least one of:
      a number of persons registered as members of a political party;
      an amount of money raised for a charity; or
      a number of times the originator of the call has called the mobile device;
  compare the genre of the call to a predetermined genre; and
  provide the call to a call message system based on the comparison of the genre of the call to the predetermined genre.

15. The method of claim 14, further comprising configuring the call message system to record header information for the call, the header information including an attribute corresponding to the genre of the call.

16. The method of claim 15, further comprising configuring the network component to write the genre of the call into the attribute upon the call being provided to the call message system.

17. The method of claim 14, further comprising configuring the call message system to place the call into communication with a predetermined message.

18. The method of claim 14, wherein the determination of the genre of the call comprises:
  determining an affiliation of the originator of the call;
  determining a time of day at which the call was made; and
  classifying the genre of the call, the classification of the genre based at least in part on the originator and at least one of the affiliation or the time of day,
  wherein the classification corresponds to a predetermined genre category.

19. The method of claim 18, wherein the determination of the genre of the call further includes:
  determining at least one of a quantitative characteristic or a qualitative characteristic of at least one of the originator of the call or the affiliation of the originator,
  wherein the classification of the genre of the call is further based on at least one of the quantitative characteristic or the qualitative characteristic.

20. The method of claim 14, wherein the determination of the genre of the call is further based at least in part on a mobile device user's designation of the originator as a blocked originator.

21. A network component comprising hardware, the network component comprising:
  a communications portion configured to:
    detect a call indicative of a call to a mobile device; and a processor portion configured to:
determine an originator of the call;
determine a genre of the call based at least in part on:
  the originator of the call;
  a quantitative characteristic of the originator of the call, the quantitative characteristic comprising at least one of:
    a number of persons registered as members of a political party;
    an amount of money raised for a charity; or
    a number of times the originator of the call has called the mobile device; and
  a qualitative characteristic of the originator of the call, the qualitative characteristic comprising at least one of:
    an environmental rating; or
    a charitable rating;
compare the genre of the call to a predetermined genre; and
at least one of terminate the call or store the call, the terminating or storing based on the comparison of the genre of the call to the predetermined genre.

22. The network component of claim 21, wherein the predetermined genre is determined by a mobile device user.

23. The network component of claim 21, wherein the determination of the genre of the call comprises:
a determination of an affiliation of the originator of the call;
a determination of a time of day at which the call was made; and
a classification of the genre of the call, the classification of the genre based at least in part on the originator and at least one of the affiliation or the time of day,
wherein the classification corresponds to a predetermined genre category.

24. The network component of claim 23, wherein the determination of the genre of the call further includes:
a determination of at least one of a quantitative characteristic or a qualitative characteristic of at least one of the originator of the call or the affiliation of the originator,
wherein the classification of the genre of the call is further based on at least one the quantitative characteristic or the qualitative characteristic.

25. The network component of claim 21, wherein the predetermined genre is based on a mobile device user's predetermined designated preference for call genres.

26. The network component of claim 21, wherein the determination of the genre of the call is further based at least in part on a mobile device user's designation of the originator as a blocked originator.

* * * * *